Oct. 13, 1931.  W. J. COULTAS ET AL  1,827,070
POWER TAKE-OFF MECHANISM FOR TRACTORS
Filed Jan. 23, 1928   2 Sheets-Sheet 2

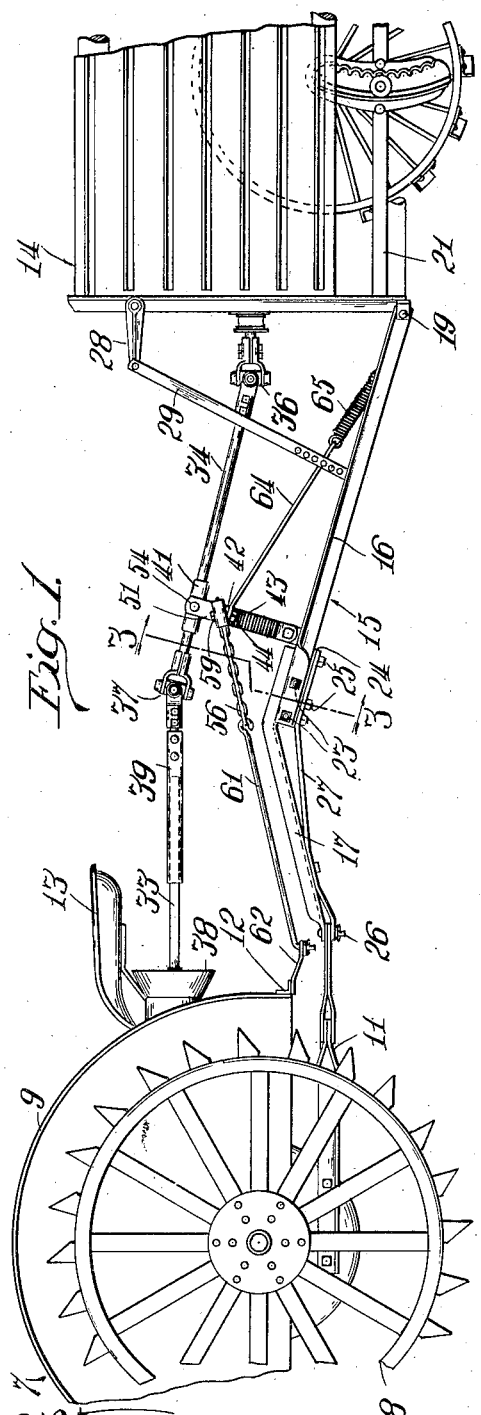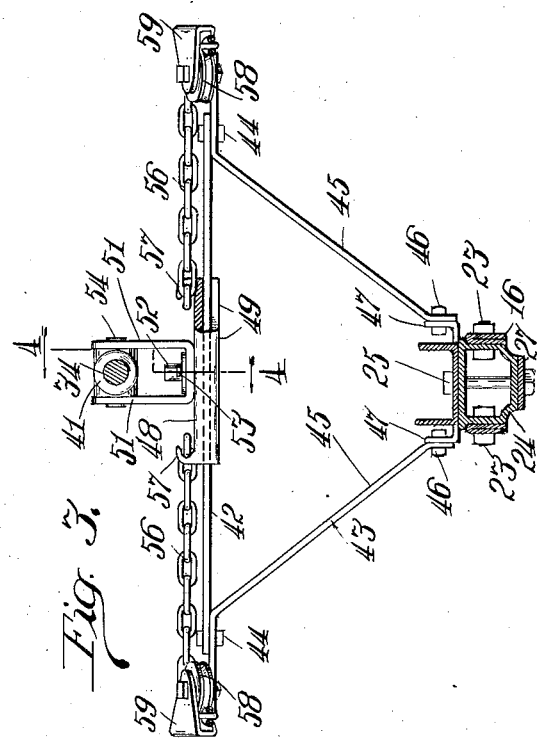

Witness
Milton Lenoir

Inventors.
Wilbur J. Coultas.
Robert C. Livesay.
By Brown, Jackson, Boettcher & Dienner.
Attorneys Patented Oct. 13, 1931

1,827,070

UNITED STATES PATENT OFFICE

WILBUR J. COULTAS AND ROBERT C. LIVESAY, OF MOLINE, ILLINOIS, ASSIGNORS TO DEERE & COMPANY, OF MOLINE, ILLINOIS, A CORPORATION OF ILLINOIS

POWER TAKE-OFF MECHANISM FOR TRACTORS

Application filed January 23, 1928. Serial No. 243,679.

The present invention relates generally to mechanisms for mechanically transmitting power between any two pivotally coupled vehicles, such as between a farm tractor and an agricultural implement which is being propelled thereby. Power take-off mechanisms are now used extensively in tractor farming operations to transmit power from the engine of the tractor directly to an operating mechanism or mechanisms of the agricultural implement. Such power take-off mechanisms generally comprise a power shaft extending between the vehicles and having a universal joint therein to permit relative angulation between the shaft sections in the steering movement of the tractor. According to the prior methods of constructing these mechanisms, serious operating difficulties arise therein when the tractor is making a turn on a relatively short radius. This is due to the fact that the conventional form of universal joint is only capable of transmitting power efficiently through a limited angle of deflection of the two shaft sections, and when the working angle between the shaft sections is extended beyond such point the universal joint begins to vibrate excessively and to slow down in speed, and, if the angle is carried to a critical point, the universal joint becomes locked against the transmission of any power.

The primary object of the present invention is to provide an improved construction of power take-off mechanism extending between a tractor and implement, or between any other pair of pivotally coupled vehicles, which power take-off mechanism will permit an unlimited range of steering movement of one vehicle relative to the other without imposing any constraint on the operation of the mechanism. Considering the invention broadly, such object is attained by providing a sectionalized power transmitting shaft having a plurality of universal joints therein which are arranged to cooperate with the steering movement of the tractor in such manner that the steering angle is fractionally distributed between the series of joints, that is to say, the steering angle of the tractor with reference to the implement is not imposed upon any one universal joint, but different portions of this angle are distributed between a plurality of joints, so that irrespective of the sharpness of the steering angle, no one universal joint is required to operate at an angle exceeding the angle of its best working efficiency. More specifically, the invention contemplates providing a multiple section jointed shaft together with means for swinging the intermediate sections of the shaft outwardly or away from the steering angle between the tractor and implement, so that the angle of deflection between any pair of adjacent shaft sections is maintained comparatively small even when the tractor is making a turn on a relatively short radius.

Other objects and advantages of the invention will appear from the following description of a preferred embodiment thereof. In the accompanying drawings illustrating such embodiment:

Fig. 1 is a side elevational view illustrating the power take-off or transmission mechanism, the tractor and implement being shown fragmentarily.

Fig. 3 is a transverse sectional view thereof, corresponding approximately to a section taken on the plane of the line 3—3 of Fig. 1.

Figure 2:
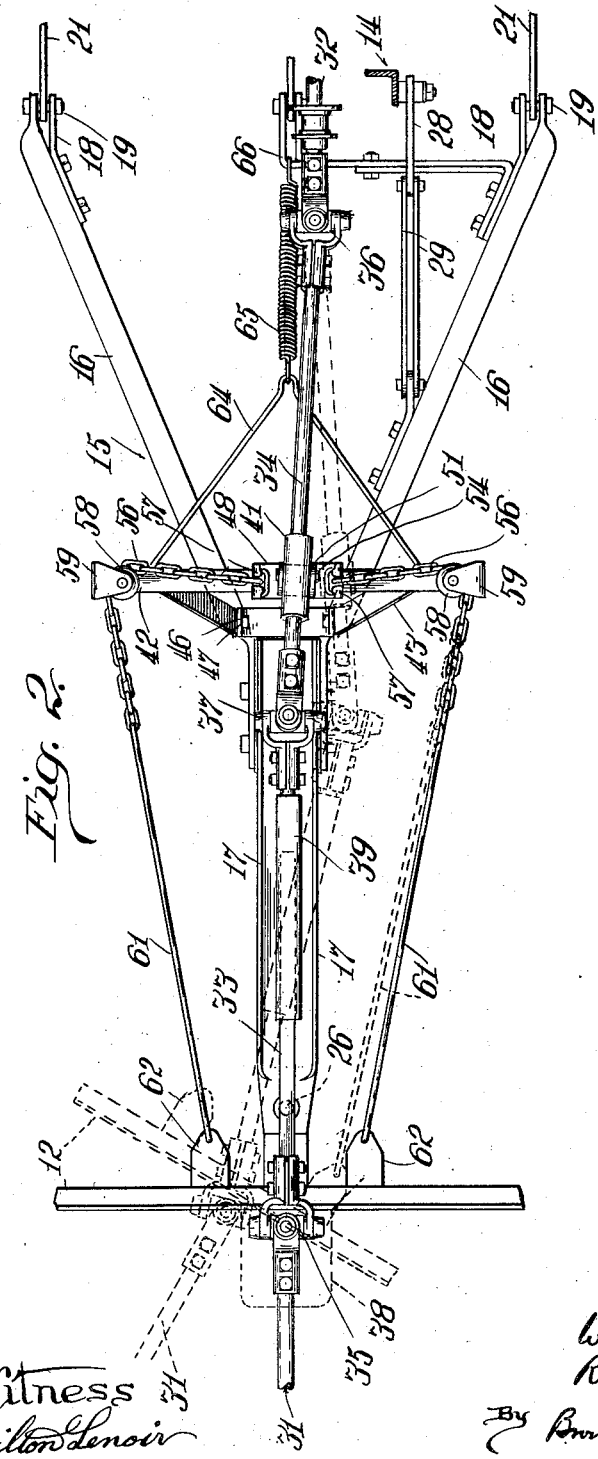
Fig. 2 is a plan view on a larger scale of the power take-off mechanism.

Referring to Fig. 1, the rear portion of a conventional design of tractor is fragmentarily illustrated at 7, the latter comprising the usual tractor wheels 8, fenders 9 and draw bar 11. A brace bar 12 usually extends transversely between the lower rear ends of the fenders 9. The operator's seat is illustrated at 13. The front portion of any representative type of tractor propelled farm implement is indicated at 14. We have illustrated a grain harvester or binder, such being representative of one type of implement with which a power take-off connection is frequently employed.

The propelling power of the tractor is transmitted to the implement through a draft member 15, which is illustrated as being constructed in the form of an arched frame. Such frame comprises two converging angle bars 16—16, and a front channel bar 17 which has its rear end secured to the angle bars 16. The latter bars are provided at their rear ends with clips or plates 18 which form clevises adapted to have pivotal attachment through bolts 19 with draft tongues or bars 21 extending forwardly from the implement. The two pivot bolts 19 are alined to provide a transverse pivot axis between the implement 14 and draft member 15, which permits fore and aft tilting between the two. The front end of each angle bar 16 has its flanges folded together and fastened by bolts 23 to the sides of a hollow frame member 24 (see Fig. 3). The channel 17 has its flanges extending upwardly, and the rear end of this channel is bent at a downward inclination to have its web portion fastened to the top of the frame member 24 by bolts 25. The front end of such channel is apertured to receive a draft pin 26 which is passed down through the end of the tractor draw bar 11. A reinforcing bar 27 is bolted to the under side of the frame member 24 and extends forwardly for receiving the coupling pin 26 on the under side of the draw bar 11. It will be seen that the foregoing construction of draft member provides a single pivot steering connection between the tractor and the implement, such single pivot corresponding to the coupling pin 26. When the draft member is employed in conjunction with a grain harvester or binder, any suitable mechanism may be provided for causing relative tilting movement between the implement frame and the draft member 15, such mechanism being typically represented by the swinging arm 28 mounted on the implement and by the link 29 which has adjustable connection between such arm and the draft member 15.

The power take-off or transmission mechanism consists of an articulated line of shafting extending between the tractor and the implement. This line of shafting comprises a driving shaft 31 (Fig. 2) mounted on the tractor, and a driven shaft 32 mounted on the implement. The driving shaft has any suitable geared connection with the engine of the tractor so as to be driven thereby either constantly or under the control of the operator, and the driven shaft 32 has any suitable operative connection with the mechanism which is to be driven on the implement. Said driving and driven shafts are operatively connected by two intermediate shaft sections 33 and 34. The front shaft section 33 is connected to the driving shaft 31 by a universal joint 35 (Fig. 2), the rear shaft section 34 is connected to the driven shaft 32 by a universal joint 36, and the two shaft sections are connected together by an intermediate universal joint 37. It is not believed necessary to describe such universal joints in detail, as they are of the well known knuckle type. The driving shaft 31 and the front universal joint 35 are preferably enclosed in a funnel shaped housing 38 so as to prevent the possibility of the operator or his clothing becoming caught in the rotating parts. The shaft section 33 is divided into two parts which are connected together to permit extension or contraction of the shaft section. To this end the shaft section proper is preferably of square or polygonal cross section and slides in a correspondingly shaped bore formed in a sleeve 39 which is connected to the intermediate universal joint 37. It will be noted that the three universal joints together with the extensible connection 39 permit relative fore and aft tilting movement between the driving and driven shafts 31 and 32 when the tractor and implement are traveling over uneven ground, as well as permitting horizontal angulation between said shafts in the steering movement of the tractor.

The two intermediate shaft sections 33 and 34 are supported at a substantially predetermined height above the draft member 15 by a bearing sleeve 41 in which the rear shaft section 34 has rotatable bearing support, preferably at a point directly in rear of the intermediate universal joint 37. This bearing sleeve also functions to shift the shaft sections outwardly or away from the steering angle between the tractor and implement, as will now be described. The sleeve is mounted for transverse sliding movement on a horizontal guide bar 42, which constitutes part of a triangularly shaped frame 43 pivotally mounted on the draft member 15. The outer ends of the guide bar 42 are bolted at 44 to two inclined frame bars 45 which extend downwardly toward the draft member. The lower ends of such frame bars are apertured to receive pivot bolts 46 which pass through the upwardly turned ends of a bar 47 which is fixedly secured to the angle bars 16 of the draft member. The two alined pivot bolts 46 define a horizontal pivot axis relative to which the frame 43 can swing fore and aft on the draft member 15.

Figure 4:
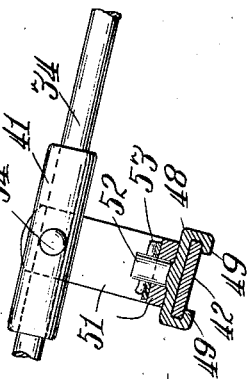
Fig. 4 is a detailed sectional view taken approximately on the plane of the line 4—4 of Fig. 3.

The bearing sleeve 41 is mounted on a sliding block or carrier 48 which is guided for sliding movement along the bar 42. Referring to Fig. 4, it will be seen that such sliding member is of channel-shaped cross section and has lower flanges 49 which are turned inwardly to embrace the under side of the guide bar 42. Pivotal connections are established between the slider member 48 and the bearing sleeve 41, which form in effect a universal joint between these parts. Such pivotal connections comprise a U-shaped member or yoke 51 which has its lower central portion swiveled upon a bearing pin 52 extending upwardly from the slider member 48, the U-shaped member being held upon such swivel pin by a cotter pin 53 or the like extending through the upper portion of the swivel pin 52. The bearing sleeve 41 is disposed between the arms of the U-shaped member 51, and has laterally extending trunnion pins 54 which are disposed in bearing openings in said arms. It will be evident that the foregoing construction permits the U-shaped member 51 to swivel substantially horizontally about the pin 52, and permits the bearing sleeve 41 to tilt fore and aft with reference to this U-shaped member.

The turning movement of the tractor is utilized to transmit sliding movement to the carrier member 48 through the instrumentality of flexible connections or links extending between such carrier member and the tractor. These flexible connections or links preferably comprise two chains 56 which are disposed above the guide bar 42 and which have their inner ends suitably linked to hooks 57 extending upwardly from the ends of the carrier member 48. The chains pass outwardly and forwardly around sheaves or pulleys 58 which have pivotal mounting in bearing yokes 59 secured to the ends of the frame members 42 or 45. The front ends of such chains are linked to rods 61 which have pivotal connection with the tractor 7 at laterally spaced points on opposite sides of the vertical plane of the coupling pin 26. Such pivotal connections are shown as being established by turning the ends of these rods downwardly through holes in bracket members 62 projecting rearwardly from the transverse fender bar 12, the rods or links 61 being held in their pivot apertures in the brackets 62 by cotter pins or nuts engaging with the lower end portions of the rods. Spring tension is normally maintained on the pivoted frame 43, normally tending to swing the same rearwardly and thereby maintaining the chains 56 and rods 61 taut. As best shown in Fig. 2, a V-shaped rod or member 64 has its end portions secured to said frame, and a tension spring 65 extends from the intermediate portion of this V-shaped member rearwardly to a suitable point of attachment on a bar 66 extending inwardly from one of the draft frame bars 16.

The dotted line position of the parts in Fig. 2 illustrates the operation of the mechanism. Assuming the tractor to be swinging to the right relative to the coupling pin 26, the forward movement of the bracket 62 on the left side of the tractor will draw the corresponding rod or link 61 forwardly, and the rearward movement of the bracket 62 on the right side of the tractor will permit the opposite rod or link 61 to move rearwardly. In consequence of this action the sliding carrier 48 will be shifted to the left along the guide bar 42, thereby swinging the two shaft sections 33—34 and the intermediate universal joint 37 outwardly or in a direction away from the steering angle subtended between the tractor and implement. As a result, the front shaft section 33 is made to follow, to a lesser degree, the swinging movement of the driving shaft 31, thus tending to reduce the angular deviation or disalinement between said shafts. Hence, only part of the total angular swing of the tractor is imposed on the front universal joint 35. The swinging of the two shaft sections 33—34 to the left places these shaft sections at a slight angle so that the intermediate universal joint is caused to operate through a slight working angle, and similarly such deflection of the shaft sections establishes an angle between the rear section 34 and the driven section 32 so that the rear universal joint 36 is also caused to operate through a slight working angle. It will be noted that this action is equivalent in effect to distributing the steering angle of the tractor between the three universal joints, so that no one joint assumes any considerable proportion of the steering angle between the vehicles. With the shaft sections thus deflected laterally, they lie substantially in the relation of adjacent cords of an arc extending substantially through the centers of the joints, with the result that the overall length of the line of shafting is increased. Such increase in length is accommodated by the shaft section 33 sliding outwardly in the long coupling sleeve 39. It will be evident that the lateral deflection of the intermediate shaft sections will be substantially proportionate to the steering angle of the tractor, so that such steering angle will be distributed substantially proportionately between the universal joints, and that such action will occur when the tractor is steered in either direction. When the two vehicles come back into a substantially straight line, after the completion of the turning movement, the intermediate shaft sections are automatically returned to their normal positions in the line of shafting between the vehicles. In the event that some abnormal condition should prevent lateral shifting of the intermediate shaft sections, the pivoted frame 43 is free to swing forwardly under the pulling action of the forwardly moving rod 61, in opposition to the tension of the spring 65, so that no breakage of the parts can occur. The tension of said spring, acting on the frame 43, tends to maintain the flexible connections 56 and 61 taut at all times. When the two vehicles are tilting fore and aft with reference to each other, as in traveling over uneven ground, or arising from adjustment of the implement relative to the draft connections, the lengthening and shortening of the telescopic connection 39 will readily accommodate such tilting movement. The ability of the pivoted frame 43 to swing fore and aft also accommodates such tilting movement.

While the construction above described constitutes what we consider to be the preferred embodiment of our invention, nevertheless it will be understood that such embodiment is merely exemplary, and that numerous changes and rearrangements may be made therein without departing from the essence of the invention.

The term "power transmission means" and "power take-off" as employed in the specification are not to be construed as limited to connections between the power plant of a power plant equipped vehicle and one not so equipped, but are intended to include any motion transmitting connections regardless of the source of energy to be transmitted, whether manually or mechanically derived.

We claim:

1. The combination with a tractor and an implement, of power take-off mechanism extending between said tractor and said implement comprising an articulated shaft, and means for swinging the intermediate portion of said articulated shaft away from the steering angle between the tractor and implement in the steering movement of said tractor.

2. The combination with a tractor and implement, of power transmission mechanism extending therebetween and comprising an articulated shaft, and means operated automatically by the steering movement of the tractor for swinging the intermediate portion of said articulated shaft outwardly in a direction away from the steering angle between the tractor and implement.

3. The combination with a tractor and an implement, said tractor having a driving shaft, and said implement having a driven shaft, of power take-off mechanism for connecting said shafts, said mechanism comprising a pair of shaft sections, universal joints connecting said shaft sections to said driving and driven shafts, and an intermediate universal joint between said shaft sections, and means operative during the steering movement of the tractor for swinging said intermediate universal joint laterally in a direction opposite to the turning movement of the tractor.

4. The combination with a tractor and an implement pivotally coupled thereto, said tractor having a driving shaft and said implement a driven shaft, of power take-off mechanism for connecting said shafts, said mechanism comprising an intermediate shaft section, a universal joint connecting said shaft section to said driving shaft, and means operative during the steering movement of the tractor for swinging said shaft section in a direction corresponding to the direction of swinging movement of said driving shaft but through less than one-half of the arcuate movement of said drive shaft to thereby lessen the angularity through which said universal joint must transmit its drive.

5. The combination with two vehicles and a draft member pivotally connecting the same, of power transmission mechanism comprising an articulated line of shafting extending between said vehicles, a shiftable member mounted on said draft member and operative to swing the intermediate portion of said line of shafting in a lateral direction, and means operated by the steering movement of one of said vehicles for actuating said shiftable member.

6. The combination with a tractor and an implement pivotally coupled together, of power transmission mechanism extending from said tractor to said implement and comprising a plurality of shaft sections, universal joints connecting said shaft sections, a guide member for moving one of said shaft sections laterally, and means operated by the steering movement of said tractor for actuating said guide member.

7. The combination with a tractor and an implement, and a draft member pivotally coupling the two together, of power transmission mechanism extending from said tractor to said implement, comprising a plurality of shaft sections, universal joints connecting said shaft sections, a bearing member for one of said shaft sections mounted for lateral shifting movement on said draft member, and means operated by the steering movement of said tractor for shifting said bearing member.

8. The combination with a tractor, an implement, and a draft member pivotally coupling the same together, of power take-off mechanism comprising an articulated line of shafting extending between said tractor and said implement, and a support for the intermediate portion of said line of shafting, said support being pivotally mounted on said draft member for fore and aft swinging movement.

9. The combination with a tractor, an implement, and a draft member pivotally coupling the same together, of power take-off mechanism extending from said tractor to said implement and comprising a plurality of shaft sections, universal joints connecting said shaft sections, a supporting member for one of the intermediate shaft sections, said supporting member being mounted for transverse shifting movement on said draft member, flexible connections between said supporting member and the tractor for causing shifting movement of said supporting member with the steering movement of said tractor, and means for maintaining said flexible connections taut.

10. The combination of a tractor, an agricultural implement, a draft member pivotally connected to said tractor for horizontal swinging movement about a substantially vertical axis and pivotally connected to said implement for vertical swinging movement about a substantially horizontal axis, a driving shaft on said tractor, a driven shaft on said implement, a pair of intermediate shaft sections, universal joints connecting the ends of said shaft sections to said driving and driven shafts, an intermediate universal joint connecting the adjacent ends of said shaft sections, an extensible and contractible telescopic connection interposed in the front shaft section, a bearing sleeve in which the rear shaft section is journaled, a frame pivotally mounted on said draft member for fore and aft swinging movement, said frame comprising a transversely extending guide bar, a carrier member shiftable along said guide bar, means pivotally supporting said bearing sleeve on said carrier member for pivotal movement in opposite planes, sheaves mounted adjacent to the outer ends of said frame, flexible members passing over said sheaves and having their inner ends connected to said carrier member, means connecting the outer ends of said flexible members to the tractor at points spaced laterally from the coupled connection of said tractor with said draft member, and spring means connected to said frame normally tending to swing the latter rearwardly.

11. The combination with two pivotally connected vehicles, a power transmission mechanism coupling a drive shaft of the one vehicle to a driven shaft of the other, a first universal joint on the drive shaft, a second universal joint on the driven shaft, a third universal joint disposed in said mechanism, means for supporting said mechanism intermediately of said first and second joints, and means responsive to a turning of said vehicles for moving said supports transversely to distribute the angle between said driving and driven shafts unequally between said three universal joints.

12. The combination with two pivotally connected vehicles, of power transmission mechanism coupling a drive shaft of the one vehicle to a driven shaft of the other, a first universal joint on the drive shaft, a second universal joint on the driven shaft, a third universal joint disposed in said mechanism, means for supporting said mechanism intermediately of said first and second joints, and means responsive to a turning of said vehicles for moving said supports transversely to distribute the angle between said driving and driven shafts proportionately between said three universal joints so that the sum of the angles at which the individual joints are working is slightly greater than the angle between said shafts.

13. In a motion transmitting means adapted to transmit motion from one pivotally connected vehicle to another comprising a plurality of shafts, means for supporting one of said shafts for horizontal pivotal movement, and means comprising links associated with said supporting means for substantially equally distributing the angularity of said shafts.

14. In a motion transmitting means adapted to transmit motion from one pivotally connected vehicle to another comprising a plurality of shafts, means for supporting one of said shafts for horizontal pivotal movement, and means comprising links associated with said supporting means and one of said shafts for substantially equally distributing the angularity of said shafts.

15. In a motion transmitting means adapted to transmit motion from one pivotally connected vehicle to another comprising a plurality of shafts, means for supporting one of said shafts for horizontal pivotal movement, and means comprising links associated with said support and said shafts for substantially equally distributing the angularity of said shafts.

16. In combination, a drawing vehicle and a drawn vehicle pivotally connected together, a rotatable shaft on each vehicle, means connecting said shafts including universal joints and an intermediate shaft, a sleeve on the intermediate shaft, and means responsive to angular movements between said vehicles in one plane and connected to said sleeve for moving said intermediate shaft in the same plane.

17. The combination with a drawing vehicle and a drawn vehicle, of an articulated line of shafting extending between the vehicles comprising a shaft on each vehicle, means connecting said shafts including an intermediate shaft and universal joints providing connection between the shafts, a sleeve on the intermediate shaft, and means responsive to relative angular movements of the vehicles and connected with the sleeve for laterally deflecting the intermediate shaft.

18. In a motion transmitting means adapted to transmit motion from one pivotally connected vehicle to another comprising a plurality of shafts, means for substantially equally distributing the angularity of the shafts, said means comprising links.

19. In a motion transmitting means adapted to transmit motion from one pivotally connected vehicle to another comprising a plurality of shafts, universal joints connecting said shafts, and means for substantially equally distributing the angularity of said shafts, said means comprising links.

20. The combination with a motion transmitting means comprising a plurality of shafts connected by universal joints, of means for substantially equalizing the angularity of the shafts when one shaft assumes an angular relation to the others, said means comprising links.

In witness whereof, we hereunto subscribe our names this 10th day of January, 1928.

WILBUR J. COULTAS.
ROBERT C. LIVESAY.